United States Patent
Cha et al.

(10) Patent No.: US 8,276,877 B2
(45) Date of Patent: Oct. 2, 2012

(54) SOLENOID VALVE CONTROLLED BY WIRELESS COMMUNICATION

(75) Inventors: Hyun Rok Cha, Gwangju (KR); Sung Ho Lee, Gwangju (KR); Dae Yeong Im, Jeollanam-do (KR); Ik Hyun Oh, Gwangju (KR); Chang Seog Kang, Gwangju (KR)

(73) Assignee: Korea Institute of Industrial Technology, Cheonan-Si (KR)

( * ) Notice: Subject to any disclaimer, the term of this patent is extended or adjusted under 35 U.S.C. 154(b) by 316 days.

(21) Appl. No.: 12/644,292

(22) Filed: Dec. 22, 2009

(65) Prior Publication Data

US 2011/0121215 A1    May 26, 2011

(30) Foreign Application Priority Data

Nov. 23, 2009  (KR) .................. 10-2009-0113466

(51) Int. Cl.
*F16K 31/02* (2006.01)
(52) U.S. Cl. ............... 251/129.04; 251/129.15
(58) Field of Classification Search ............. 251/129.04, 251/129.15
See application file for complete search history.

(56) References Cited

U.S. PATENT DOCUMENTS

| | | | | |
|---|---|---|---|---|
| 5,588,636 | A * | 12/1996 | Eichholz et al. | 251/129.04 |
| 5,856,771 | A * | 1/1999 | Nippert | 335/262 |
| 5,923,246 | A * | 7/1999 | Hartsfield | 340/501 |
| 6,062,496 | A * | 5/2000 | Kinter | 239/462 |
| 6,918,571 | B1 * | 7/2005 | Rose | 251/129.18 |
| 2004/0089346 | A1 * | 5/2004 | Sutardja | 137/377 |
| 2007/0106426 | A1 * | 5/2007 | Ensworth et al. | 700/284 |
| 2007/0179674 | A1 * | 8/2007 | Ensworth et al. | 700/284 |
| 2008/0053540 | A1 * | 3/2008 | Patient | 137/624.12 |
| 2008/0275595 | A1 * | 11/2008 | Bailey et al. | 700/284 |
| 2009/0050831 | A1 * | 2/2009 | Harrison, Jr. | 251/129.16 |

* cited by examiner

*Primary Examiner* — John K Fristoe, Jr.
*Assistant Examiner* — Seth Faulb
(74) *Attorney, Agent, or Firm* — Reinhart Boerner Van Deuren P.C.

(57) ABSTRACT

A solenoid valve controlled by wireless communication, in which the operation of the valve is controlled by wireless communication, thereby reducing costs and labors necessary for installation and maintenance. The solenoid valve includes a valve body having an inlet port, through which fluid is introduced, and an outlet port, through which fluid is discharged; a plunger movably mounted inside the valve body to open or close one or both of the inlet and outlet ports; a solenoid, which drives the plunger to a position, in which the plunger opens or closes one or both of the inlet and outlet ports, when electric power is supplied; and a communication module provided on the valve body. The communication module receives a wireless control signal transmitted from outside and controls the electric power supplied to the solenoid valve depending on the wireless control signal.

4 Claims, 3 Drawing Sheets

SOLENOID VALVE CONTROLLED BY WIRELESS COMMUNICATION

CROSS REFERENCE TO RELATED APPLICATION

The present application claims priority from Korean Patent Application Number 10-2009-0113466 filed on Nov. 23, 2009, the entire contents of which application is incorporated herein for all purposes by this reference.

BACKGROUND OF THE INVENTION

1. Field of the Invention

The present invention relates to a solenoid valve controlled by wireless communication, and more particularly, to a solenoid valve controlled by wireless communication, in which the operation of the solenoid valve is controlled by wireless communication, thereby reducing costs and labors necessary for installation and maintenance.

2. Description of Related Art

In general, a solenoid valve is a device in which a spool is moved by an electromagnetic force from a solenoid, thereby opening and closing an orifice in a valve body. The solenoid valve can easily adjust the flow of fluid by controlling a current applied to the solenoid.

Accordingly, a plurality of systems, which automatically controls the flow of fluid, uses a solenoid valve. A conventional solenoid valve is configured to operate in response to a control signal, which is transmitted by wires.

However, such a method of transmitting a signal by wires requires additional processing such as connection of cables and wiring, additional devices such as a magnetic switch, and the like. Thus, a large amount of costs, times and labors are spent to install and maintain the conventional solenoid valve. In particular, in outdoor facilities, factories, or the like, cables are frequently broken down by moving objects or animals such as rats. When the cables are cut, it is difficult to find the cut positions. Thus, a large amount of times and costs are spent to repair the cables. If the cut positions are not found, the entire cables have to be collected or replaced, thereby spending a greater amount of times and costs.

The information disclosed in this Background of the Invention section is only for the enhancement of understanding of the background of the invention and should not be taken as an acknowledgment or any form of suggestion that this information forms a prior art that would already be known to a person skilled in the art.

BRIEF SUMMARY OF THE INVENTION

Various aspects of the present invention provide a solenoid valve controlled by wireless communication, in which the operation of the valve is controlled by wireless communication, thereby reducing costs and labors necessary for installation and maintenance.

In an aspect of the present invention, the solenoid valve may include a valve body having an inlet port, through which fluid is introduced, and an outlet port, through which fluid is discharged; a plunger movably mounted inside the valve body to open or close one or both of the inlet and outlet ports; a solenoid, which drives the plunger to a position, in which the plunger opens or closes one or both of the inlet and outlet ports, when electric power is supplied; and a communication module provided on the valve body. The communication module may receive a wireless control signal transmitted from outside and control the electric power supplied to the solenoid valve depending on the wireless control signal.

According to an exemplary embodiment of the invention, the communication module may include a wireless receiver, which receives a wireless control signal; a controller, which outputs an operation signal for controlling the operation of the solenoid in response to the control signal received by the wireless receiver; a power supply, which supplies a supply voltage to the wireless receiver and the controller; and a power controller, which controls a current supplied from the power supply or an external power source to the solenoid in response to the operation signal output from the controller.

In the communication module, the controller may compare the received control signal with a predetermined signal format and outputs, if the control signal is equal to the predetermined signal format, the operation signal to the power controller.

In this case, the communication module may further include a status display that provides an optical or auditory indication of an error indication signal, which is output if the control signal received in the controller is not equal to the predetermined signal format.

In addition, the controller of the communication module may compare a valve-specific identification code, included in the received control signal, with an identification code of the solenoid valve and outputs, if the identification codes are equal to each other, an operation signal to the power controller.

According to an exemplary embodiment of the invention, the communication module may be a ZigBee communication module.

Preferably, the communication module may have a frequency band of 2.5 GHz.

Preferably, the power supply may be a battery.

According to an exemplary embodiment of the invention, the communication module may further include a wireless transmitter that transmits an operating status signal indicative of the valve.

According to exemplary embodiments of the present invention as set forth above, the solenoid valve provides the following effects.

(1) Since the supply of electric power to the solenoid is enabled or disabled depending on a control signal, which is transmitted from the wireless transmitter of the system controller and is received by the wireless receiver, it is possible to exclude cables, which are used for the transmission of signals, and additional devices, thereby reducing costs and labors necessary for the installation and maintenance of the valve.

(2) The received control signal is compared with the predetermined signal format so that the solenoid is actuated if the control signal is equal to the predetermined signal format and an error message is displayed if the control signal is not equal to the predetermined signal format. Accordingly, it is possible to a plurality of solenoid valves using one system controller and to quickly and simply check an error in the operation of all of the solenoid valves.

(3) The valve-specific identification code, included in received control signal, is compared with the identification code of the solenoid valve, so that the valve is controlled only if the identification codes are equal to each other. Accordingly, it is possible to accurately control a plurality of solenoid valves using one system controller.

(4) It is possible to exclude cables, which are used for the supply of electric power, by constructing a low power-network based on ZigBee wireless communication, which can use a battery as a power source. This can further reduce costs and labors necessary for the installation and maintenance of the valve.

(5) The solenoid valve can be provided with a wireless transmitter, which sends an operating status to the system controller by transmitting it to the communication module. As an advantage, it is possible to quickly and simply check the operating statuses of all of the solenoid valves, which are controlled by one system controller.

The methods and apparatuses of the present invention have other features and advantages which will be apparent from, or are set forth in greater detail in, the accompanying drawings, which are incorporated herein, and in the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments that may be included within the spirit and scope of the invention as defined by the appended claims.

Figure 1:
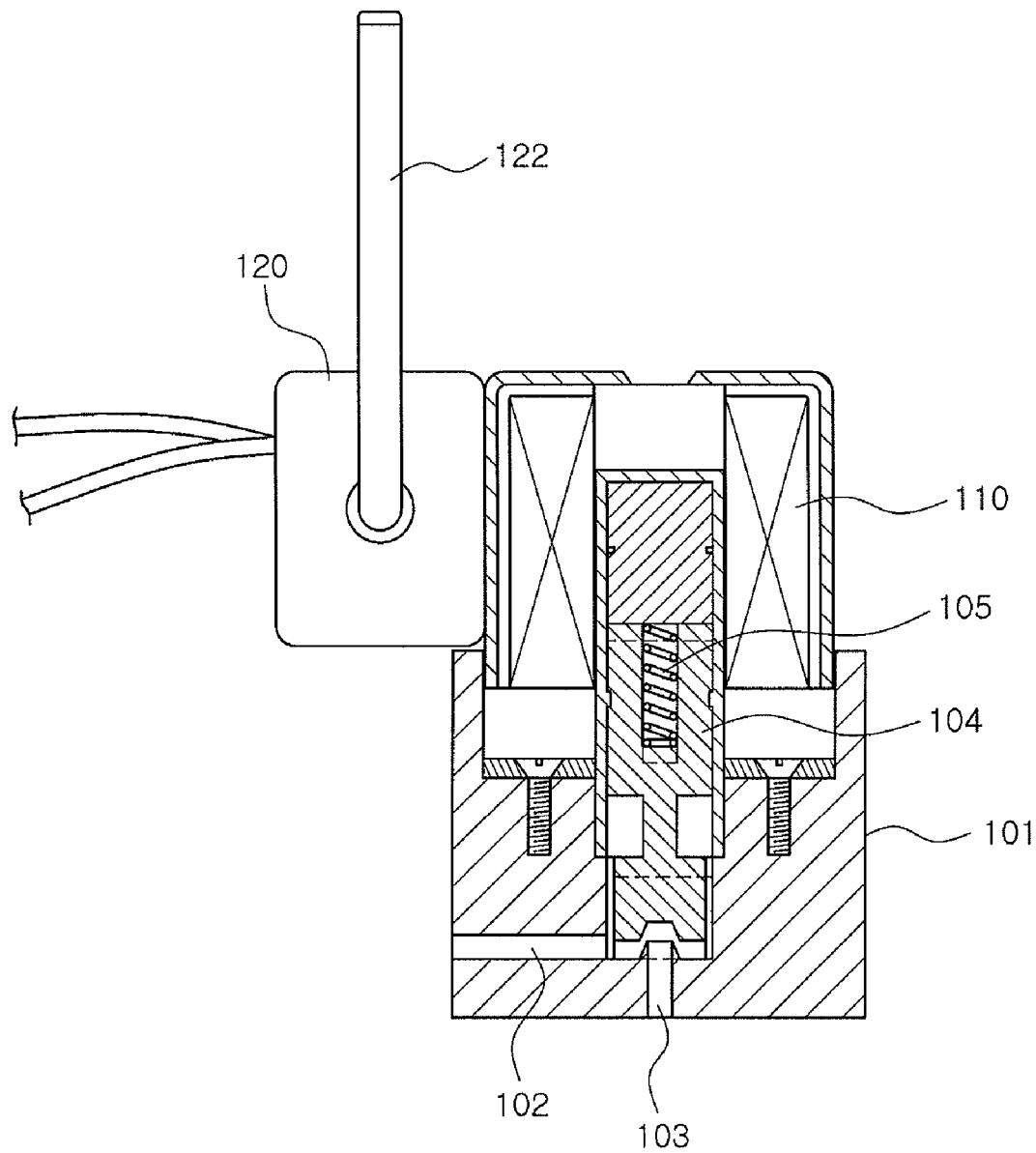
FIG. 1 is a cross-sectional view showing a solenoid valve controlled by wireless communication according to an exemplary embodiment of the invention.
Figure 2:
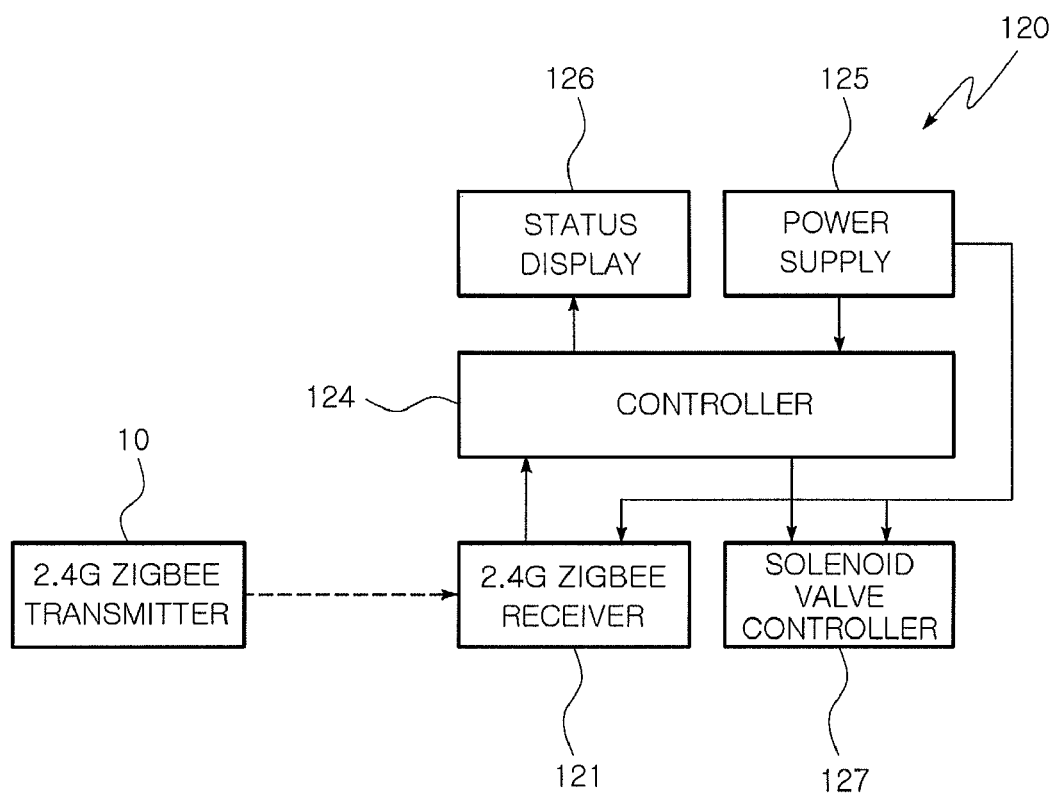
FIG. 2 is a block diagram showing the configuration of a wireless control module in the solenoid valve shown in FIG. 1.
Figure 3:
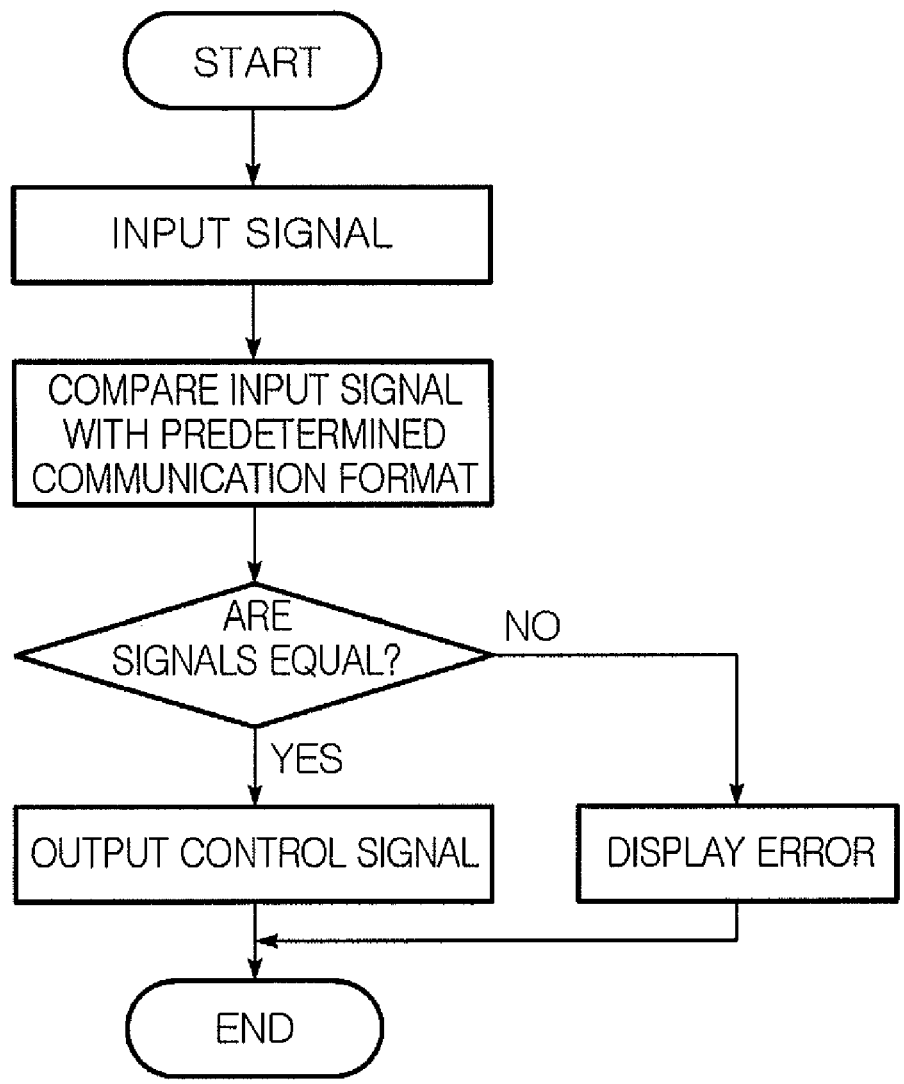
FIG. 3 is a flowchart showing an operation process of the solenoid valve shown in FIG. 1.

FIG. 1 is a cross-sectional view showing a solenoid valve controlled by wireless communication according to an exemplary embodiment of the invention, FIG. 2 is a block diagram showing the configuration of a wireless control module in the solenoid valve shown in FIG. 1, and FIG. 3 is a flowchart showing an operation process of the solenoid valve shown in FIG. 1.

As shown in the figures, the solenoid valve of this embodiment includes a valve body 101, a plunger 104, a solenoid 110, and a communication module 120. The valve body 101 has an inlet port 103, through which fluid is introduced, and an outlet port 102, through which fluid is discharged. The plunger 104 is movably installed inside the valve body 101, and is forced downward by a spring 105 to close the inlet port 103. The solenoid 110 is provided above the valve body 101 to move the plunger 104 upward when electric power is supplied thereto. The communication module 120 controls the electric power supplied to the solenoid 110 according to a control signal transmitted from outside.

In this exemplary embodiment, the communication module 120 can be a ZigBee communication module.

ZigBee is a specification for wireless personal area networks. This technology provides a relatively low transmission rate from 20 kbps to 250 kbps, but is suitable for short range wireless communication associated with home automation or industrial automation since it uses a small amount of electric power.

ZigBee operates in radio bands such as 868 MHz, 902 to 928 MHz, and 2.4 GHz. In an exemplary embodiment of the invention, it is more preferable for the ZigBee communication module to operate in the 2.4 GHz radio band.

The communication module 120 includes a wireless receiver 121, a controller 124, a status display 126, a power supply 125, and a power controller 127. The wireless receiver 121 receives a wireless control signal transmitted from a wireless transmitter 10 of a system controller (not shown), which is separately provided. The controller 124 outputs an operation signal for controlling the operation of the solenoid 110 in response to the received control signal. The status display 126 displays the signal reception status of the wireless receiver 121. The power supply 125 supplies a supply voltage to the wireless receiver 121, the controller 124, and the status display 126. The power controller 127 controls a current supplied from the power supply 125 or an external power source to the solenoid 110 in response to the operation signal output from the controller 124.

The wireless receiver 121 is a receiver that receives a ZigBee wireless signal in the 2.4 GHz band and provides the received ZigBee wireless signal as an input into the controller 124. The wireless receiver 121 also has a receiving antennal 122.

The controller 124 is implemented with a microcomputer (MCU) or a microcontroller that compares the control signal, input into the wireless receiver 121, with a predetermined signal format and outputs a corresponding operation signal to the power controller 127 or the status display 126. Preferably, the controller 124 compares an identification code of each solenoid valve, included in the input control signal, with an identification code of a corresponding solenoid valve and outputs, based on the result of the comparison, a solenoid on/off operation signal to the power controller 127 or an error indication signal to the status display 126.

The status display 126 displays a reception error depending on the operation signal output from the controller 124 if the control signal input into the wireless receiver 121 is different from the predetermined signal format. The status display 126 can be an optical display device such as a Liquid Crystal Display (LCD) or a Light Emitting Diode (LED) module. The status display 126 can additionally include an auditory display device such as a speaker.

The power supply 125 can be a power supply that supplies an alternating supply voltage by transforming and rectifying it, or be a battery that supplies a direct supply voltage.

The power controller 127 is a device that turns on/off the electric power, which is supplied from the power supply 125 to the solenoid 110 in response to the operation signal from the controller 124. The power controller 127 can be implemented with a variety of electronic or mechanical switches.

A description will be given of the operation of the solenoid valve having the above-described construction according to an exemplary embodiment of the invention with reference to FIG. 3.

The solenoid valve according to an exemplary embodiment of the invention is provided in a variety of devices and facilities, which are installed at homes, industrial fields, or the like. A plurality of solenoid valves are provided in an area, in which they can receive wireless control signals transmitted from the wireless transmitter of the system controller, so that their operations can be controlled by the control signals received by the wireless receiver 121.

Describing in more detail, when the wireless transmitter of the system controller transmits a wireless control signal for opening/closing the solenoid valve, the wireless receiver 121 of the communication module 120 receives the control signal, which is then input into the controller 124 of the communication module 120. Here, it is preferable that the control signal include an identification code assigned to a specific solenoid valve, and that the controller 124 confirm whether or not the input control signal is for operating the solenoid valve by checking whether or not the identification code of the input control signal is equal to the identification code of the solenoid valve.

The controller 124 determines whether or not the received control signal is a correct signal by comparing it with a predetermined signal format. If the received control signal is a correct signal, the controller 124 sends an operation signal corresponding to the input control signal to the power controller 127. If the received control signal is not a correct signal, the controller 124 sends an error indication signal to the status display 126.

When the operation signal from the controller 124 is properly sent to the power controller 127, it enables or disables the supply of the electric power to the solenoid 110, so that the plunger 104 is driven upward or downward to open or close the valve.

When an error indication signal from the controller 124 is sent to the status display 126, the operation control by the power controller 127 is not enabled but a communication error is notified by flickering of a lamp of the status display 126, a display on a display device, or a warning sound from a speaker.

As described above, in the solenoid valve according to this exemplary embodiment, the operation of the valve is controlled by the control signal, which is transmitted from the wireless transmitter and received by the wireless receiver 121. Since neither cables nor additional devices for transmitting signals are necessary, the valve can be installed quickly at a low cost. In addition, it is possible to reduce costs and manpower necessary for maintenance since repair due to the breakdown of the cables is unnecessary.

In addition, it is possible to exclude cables, which are used for the supply of electric power, by constructing a low power-network based on ZigBee wireless communication, which can use a battery as a power source. This can further reduce costs and labors necessary for the installation and maintenance of the valve.

While the foregoing embodiment has been illustrated with respect to the solenoid valve that is configured to receive a control signal transmitted from the system controller, the present invention is not limited thereto. Rather, the solenoid valve can be provided with a wireless transmitter, which sends an operating status to the system controller by transmitting it to the communication module 120. As an advantage, it is possible to quickly and simply check the operating statuses of all of the solenoid valves, which are controlled by one system controller.

The foregoing descriptions of specific exemplary embodiments of the present invention have been presented for the purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A solenoid valve comprising:
    a valve body having an inlet port, through which fluid is introduced, and an outlet port, through which fluid is discharged;
    a plunger movably mounted inside the valve body to open or close one or both of the inlet and outlet ports;
    a solenoid, which drives the plunger to a position, in which the plunger opens or closes one or both of the inlet and outlet ports, when electric power is supplied; and
    a communication module provided on the valve body, wherein the communication module receives a wireless control signal transmitted from outside and controls the electric power supplied to the solenoid valve depending on the wireless control signal;
    wherein the communication module includes:
    a wireless receiver, which receives the wireless control signal;
    a controller, which outputs an operation signal for controlling an operation of the solenoid in response to the wireless control signal received by the wireless receiver;
    a power supply, which supplies a supply voltage to the wireless receiver and the controller; and
    a power controller, which controls a current supplied from the power supply or an external power source to the solenoid in response to the operation signal output from the controller;
    wherein the controller of the communication module compares the wireless control signal with a predetermined signal format and outputs, if the wireless control signal is equal to the predetermined signal format, the operation signal to the power controller;
    wherein the communication module further includes a status display that provides an optical or auditory indication of an error indication signal, which is output if the wireless control signal received in the controller is not equal to the predetermined signal format;
    wherein the controller of the communication module compares a valve specific identification code, included in the wireless control signal, with an identification code of the solenoid valve and outputs, if the identification codes are equal to each other, an operation signal to the power controller.

2. The solenoid valve according to claim 1, wherein the communication module has a frequency band of 2.5 GHz.

3. The solenoid valve according to claim 1, wherein the power supply comprises a battery.

4. The solenoid valve according to claim 1, wherein the communication module further includes a wireless transmitter that transmits an operating status signal indicative of the valve.

* * * * *